United States Patent
Sasse et al.

(10) Patent No.: US 9,005,037 B2
(45) Date of Patent: Apr. 14, 2015

(54) ROTATIONAL VIBRATION DAMPER, PARTICULARLY FOR THE POWER TRAIN OF A VEHICLE

(75) Inventors: Christoph Sasse, Schweinfurt (DE); Armin Stürmer, Rannungen (DE); Jörg Sudau, Niederwerrn (DE); Monika Rössner, Donnersdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 316 days.

(21) Appl. No.: 13/456,465

(22) Filed: Apr. 26, 2012

(65) Prior Publication Data
US 2012/0273313 A1 Nov. 1, 2012

(30) Foreign Application Priority Data

Apr. 28, 2011 (DE) .................. 10 2011 017 651

(51) Int. Cl.
| | | |
|---|---|---|
| *F16F 15/121* | (2006.01) | |
| *F16H 45/02* | (2006.01) | |
| *F16F 15/134* | (2006.01) | |

(52) U.S. Cl.
CPC ............ *F16H 45/02* (2013.01); *F16F 15/1343* (2013.01); *F16H 2045/021* (2013.01); *F16H 2045/0226* (2013.01); *F16H 2045/0284* (2013.01)

(58) Field of Classification Search
CPC . F16F 15/1217; F16F 15/123; F16F 15/1232; F16F 15/13461; F16F 15/13469
USPC ................ 464/68.9–68.92; 192/203, 205
See application file for complete search history.

(56) References Cited

U.S. PATENT DOCUMENTS

| | | | |
|---|---|---|---|
| 1,893,486 | A | * 1/1933 | Black |
| 4,687,087 | A | 8/1987 | Tebbe |
| 4,775,042 | A | 10/1988 | Kohno et al. |
| 2010/0222149 | A1 * | 9/2010 | Yamamoto et al. |

FOREIGN PATENT DOCUMENTS

| | | |
|---|---|---|
| DE | 34 31 809 | 3/1986 |
| DE | 36 07 240 | 9/1986 |
| DE | 100 12 835 | 11/2001 |
| EP | 1 672 198 | 6/2006 |
| WO | WO99/60286 | 11/1999 |

* cited by examiner

*Primary Examiner* — Gregory Binda
(74) *Attorney, Agent, or Firm* — Cozen O'Connor

(57) ABSTRACT

A rotational vibration damper includes a primary side (32) and a secondary side (46) which is rotatable with respect to the primary side (32) around an axis of rotation (A) against the action of a damper element arrangement (28). At least one damper element unit (42) of the first group (70) and at least one damper element unit (42') of the second group (70') are pre-loaded, and the primary side (32) and the secondary side (46) are pre-loaded in a basic relative rotation position with respect to one another. Proceeding from the basic relative rotation position of the primary side (32) with respect to the secondary side (46), a pre-loading path (V, V') of at least one pre-loaded damper element unit (42) is shorter than a maximum relative rotation path of the primary side (32) with respect to the secondary side (46).

14 Claims, 4 Drawing Sheets

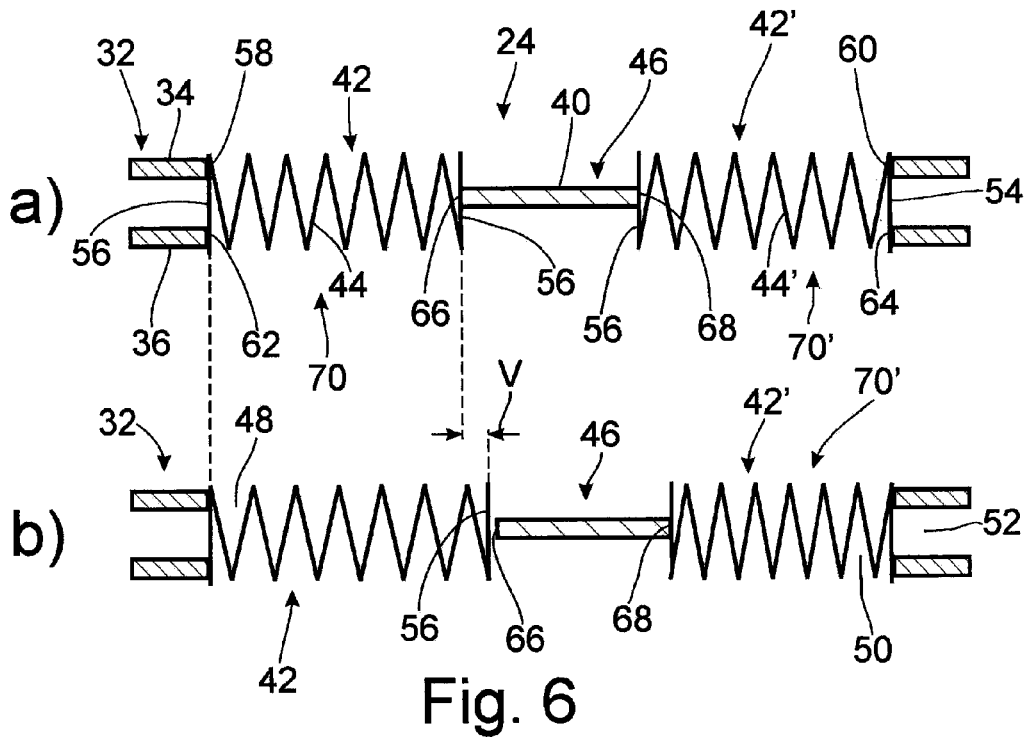
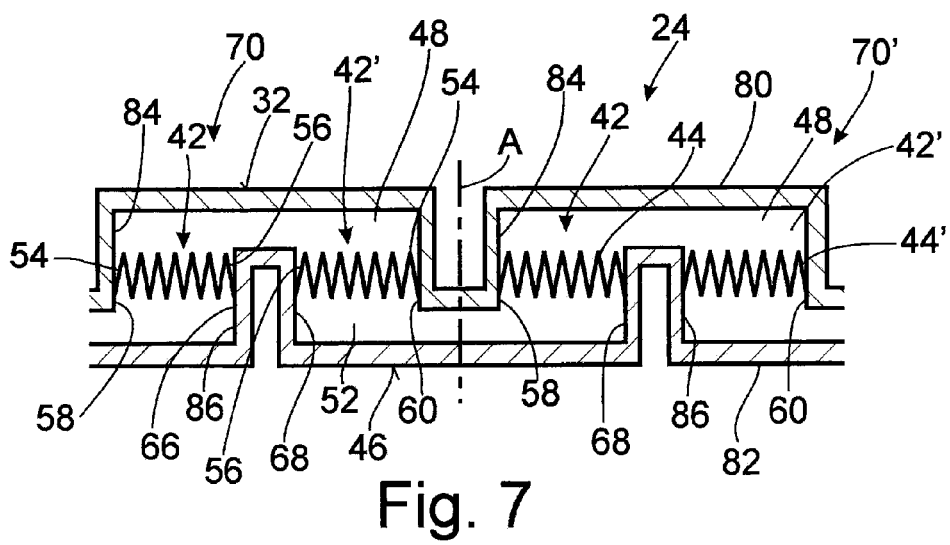

ROTATIONAL VIBRATION DAMPER, PARTICULARLY FOR THE POWER TRAIN OF A VEHICLE

BACKGROUND OF THE INVENTION

1. Field of the Invention

The present invention is directed to a rotational vibration damper, particularly for the power train of a vehicle.

2. Background and Summary of the Invention

The rotational vibration damper of the present invention comprises a primary side and a secondary side which is rotatable with respect to the primary side around an axis of rotation against the action of a damper element arrangement, wherein the damper element arrangement comprises a first group of damper element units and a second group of damper element units, wherein for each damper element unit a first torque transmission supporting area is provided at the primary side and a second torque transmission supporting area is provided at the secondary side, and wherein the damper element units of the first group oppose a relative rotation between the primary side and the secondary side only in a first relative rotation direction, and the damper element units of the second group oppose a relative rotation between the primary side and the secondary side only in a second relative rotation direction opposed to the first relative rotation direction, wherein at least one damper element unit of the first group and at least one damper element unit of the second group are pre-loaded, and the primary side and the secondary side are pre-loaded with respect to one another in a basic relative rotation position.

FIG. 1 shows various assemblies in a hydrodynamic torque converter A which contribute to the damping of torsional vibrations or torsional nonuniformities which occur in the torque transmission state and are transmitted in a power train. A torsional vibration damper arrangement D having two radially staggered torsional vibration dampers E, E' acting in series lies in the torque transmission path between a lockup clutch B and a driven hub C which is to be coupled with a transmission input shaft or the like so as to be fixed with respect to rotation relative to it. The torque absorbed in the engaged state of the lockup clutch B is directed to the driven hub C initially via the first torsional vibration damper E and then via the second torsional vibration damper E' so that the torsional vibration damper arrangement D is basically considered to be an assembly which transmits the torque, or at least a portion of the torque, in the torque transmission state of the hydrodynamic torque converter A or of a power train outfitted therewith.

Another assembly contributing to the mitigation of rotational vibration is a rotational vibration damper arranged axially between the torsional vibration damper arrangement D and a turbine wheel F. This rotational vibration damper G is designed as a deflection mass pendulum arrangement whose deflection mass 26, which is located on the radially outer side and can have an annular structure or a plurality of mass elements distributed in circumferential direction, can be excited to vibrate when vibration excitations occur counter to the action of a damper element arrangement, designated in general by I. A vibration is built up in this way and is superimposed on the exciting vibrations, thereby at least partially eliminating the latter in the manner of a fixed-frequency mass damper. A rotational vibration damper constructed in this way as a deflection mass pendulum arrangement is basically to be interpreted within the meaning of the present invention as an assembly which does not conduct torque in the torque transmission state but which is coupled with the torque-transmitting assemblies. This means that the damper element arrangement I of the rotational vibration damper G does not transmit the torque that is to be transmitted in the torque transmission state between the lockup clutch B, or a housing arrangement J of the hydrodynamic torque converter A, and the driven hub C. Rather, the rotational vibration damper G in the illustrated example is coupled by a primary side K thereof, to be described more fully hereinafter, with an intermediate mass arrangement between the two torsional vibration dampers E, E'.

This primary side K of the rotational vibration damper G comprises two cover disk elements L, L' which are arranged at a distance from one another axially and which are fixedly connected to one another, for example, by rivet bolts or the like, and are accordingly held at a distance from one another axially. The two cover disk elements L, L' are connected to the intermediate mass arrangement, already mentioned, by a coupling member M.

A secondary side of the torsional vibration damper G comprises a central disk element N. The latter supports the deflection mass arrangement H in its radially outer area or itself contributes to the increase in the mass thereof.

The two cover disk elements L, L' on the one hand and the central disk element N on the other hand are rotatable with respect to one another around an axis of rotation Z counter to the action of the damper element arrangement I. As is shown schematically in FIG. 2 considered from the radially outer side, the damper element arrangement I comprises a plurality of damper element units O which are, for example, arranged successively in circumferential direction around the axis of rotation Z and are preferably also situated at approximately the same radial level. For example, each damper element unit O can comprise an elastically deformable damper element P which, in the present embodiment example, is a helical compression spring. Of course, each damper element unit, or at least some of the damper element units, could comprise a plurality of damper elements P which are, for example, nested one inside the other or arranged successively in circumferential direction.

Spring windows R, R', R" are formed, respectively, in the cover disk elements L, L' of the primary side K of the rotational vibration damper G and in the central disk element N of a secondary side Q of the rotational vibration damper G. Two spring windows R, R' of cover disk elements L, L' together define a whole spring window of the primary side K. In the state shown in FIG. 2 in which the primary side K and the secondary side Q are in a neutral relative rotation position with respect to one another, i.e., are not deflected with respect to one another by forces acting in circumferential direction, the spring windows R, R', R" are situated so as to substantially completely cover one another in circumferential direction, i.e., they are not offset relative to one another in circumferential direction. A damper element unit O is received in these spring windows R, R', R", which are respectively associated with one another, in such a way that the circumferential end areas S, S' of this damper element unit O are supported at respective torque transmission supporting areas T, T' of cover disk element L, torque transmission supporting areas U, U' of cover disk element and torque transmission supporting areas W, W' of the central disk element N, respectively, these torque transmission supporting areas adjoining the spring windows R, R', R" in circumferential direction.

However, this uniform support at all of these torque transmission supporting areas T, T', U, U', W, W' in the neutral relative rotation position when damper element unit O is basically installed under pre-loading, exists only in hypothetical ideal cases. For reasons pertaining to manufacturing technique, it must be assumed that not all of the spring windows R, R', R" have the same circumferential extension, i.e., that the torque transmission supporting areas respectively formed at the latter also have exactly the same circumferential spacing. As a result, for example, in the case illustrated in FIG. 2 in which the spring window R" in the cover disk element N has a slightly smaller circumferential extension, i.e., a slightly smaller circumferential distance between the torque transmission supporting areas W, W' provided there, the damper element unit O or damper element P thereof contacts the torque transmission supporting areas W, W' under pre-loading in the neutral relative rotation position, but has a slight distance from the torque transmission supporting areas T, T', U, U' of the cover disk elements L, L1 which corresponds to the manufacturing tolerance and which, in FIG. 2, is divided into two approximately equal partial distances $a_1$ and $a_2$. Accordingly, in principle there is movement play in proportion to the sum of the two partial distances $a_1$ and $a_2$ in which at least this damper element unit O is not effective in an area around the neutral relative rotation position and, to this extent, there is no force opposing a relative movement of the secondary side Q and, therefore, of the deflection mass arrangement H. It is only when there is a range of movement exceeding the two partial distances $a_1$ and $a_2$ during a greater relative deflection that the torque transmission supporting areas T, U' of the cover disk elements L, L', for example, come into contact with the circumferential end area S' of the damper element unit O, while the circumferential end area S continues to remain in contact with the torque transmission supporting area W of the central disk element N. Starting from this state, a further relative rotation then takes place between the primary side K and the secondary side Q accompanied by a further compression of the damper element unit O. With relative impingement in the opposite direction, the torque transmission supporting areas 58, 62 of the cover disk elements L, L' take effect, while torque transmission supporting area 68 of central disk element N remains effective.

This means that there is basically an undefined vibration behavior of the secondary side Q and of the deflection mass arrangement H coupled therewith in a small rotational angle area around the neutral relative rotation position because of unavoidable manufacturing tolerances. As a result, the rotational vibration damper G works with a more or less undefined spring constant of the damper element arrangement I at least in this relative rotation angle area and, therefore, its absorbing or damping action which is generally tuned to a specific frequency cannot take full effect.

A rotational vibration damper in which two opposing groups of damper element units are provided is known from WO 99/60286. Each damper element unit comprises a damper element which is constructed as a helical compression spring and which is supported in one circumferential end area at a first torque transmission supporting area of the primary side and in another circumferential end area at a second torque transmission supporting area of the secondary side. For example, two first torque transmission supporting areas of the primary side at which the damper element units of the different groups can be supported are situated between two second torque transmission supporting areas of the secondary side.

The damper element units, i.e., the helical compression springs, are installed under pre-loading so that the primary side and the secondary side are pre-loaded in a basic relative rotation position with respect to one another and, in this basic relative rotation position, the different damper element units, i.e., the helical compression springs, are not completely relaxed. In particular, the construction is effected in such a way that, in both relative rotation directions, the damper element units or helical compression springs gradually relaxing in a respective relaxed relative rotation state cannot reach a completely relaxed state over the entire range of relative rotation between the primary side and secondary side, i.e., until the maximum relative rotation between the primary side and secondary side is achieved. This results in a torsion characteristic that is constant over the entire possible relative rotation angle between the primary side and secondary side without movement play caused by manufacturing tolerances and without a change in the spring rate in the permissible range of rotational angle.

It is an object of the present invention to provide a rotational vibration damper, particularly for the power train of a vehicle, which provides an improved vibration damping behavior.

According to the invention, this object is met by a rotational vibration damper, particularly for the power train of a vehicle, comprising a primary side and a secondary side which is rotatable with respect to the primary side around an axis of rotation against the action of a damper element arrangement, wherein the damper element arrangement comprises a first group of damper element units and a second group of damper element units, wherein for each damper element unit a first torque transmission supporting area is provided at the primary side and a second torque transmission supporting area is provided at the secondary side, and wherein the damper element units of the first group oppose a relative rotation between the primary side and the secondary side only in a first relative rotation direction, and the damper element units of the second group oppose a relative rotation between the primary side and the secondary side only in a second relative rotation direction opposed to the first relative rotation direction, wherein at least one damper element unit of the first group and at least one damper element unit of the second group are pre-loaded, and the primary side and the secondary side are pre-loaded in a basic relative rotation position with respect to one another.

It is further provided that, proceeding from the basic relative rotation position of the primary side with respect to the secondary side, a pre-loading path of at least one pre-loaded damper element unit is shorter than a maximum relative rotation path of the primary side with respect to the secondary side.

While every damper element unit in the construction which was described above referring to FIGS. 1 and 2 can exhibit a restoring action regardless of the relative rotation position between the primary side and the secondary side, the damper element units of the two groups basically act in opposition to one another in the construction according to the invention. Due to the fact that the damper element units of the first group oppose a relative rotation in one direction and the damper element units of the second group oppose a relative rotation in the other, opposite direction, the primary side and the secondary side are reliably loaded in the neutral relative rotation position by these two groups. This prevents movement play between the primary side and the secondary side in the area of the neutral relative rotation position without activity of the damper element units even in the event of manufacturing tolerances which are unavoidable per se.

By providing a limited pre-loading path for at least one of the damper element units, this damper element unit acts in such a way that, starting from the neutral relative rotation position, during the relaxation of this damper element unit, it first runs through the pre-loading path in which the damper element unit relaxes to its maximum possible extent. In this phase of the relative rotation between the primary side and the secondary side, the latter rotates against the restoring action at least of an increasingly tensioned damper element unit, while the at least one gradually relaxed damper element unit basically assists this relative rotation. When the end of the pre-loading path is reached, an ongoing relative rotation continues between the primary side and the secondary side only against the action of at least one damper element unit which then continues to be increasingly tensioned, while the at least one damper element unit which is pre-loaded in the neutral relative rotation position no longer acts in an assisting manner. Accordingly, at the end of the pre-loading path a transition takes place in the restoring characteristic line of the rotational vibration damper in the sense that initially when running through the pre-loading path the characteristic line, proceeding from a value of zero, rises at a steeper inclination, which corresponds to a larger spring constant, i.e., a harder damper, and when the pre-loading path is exceeded and up until the maximum relative rotation, becomes flatter, which corresponds to a smaller spring constant and thus a reduced hardness. This transition in the characteristic line has an advantageous effect on the total vibration and damping behavior insofar as, in principle, larger vibration deflections occur at lower rotational speeds in a drive system, and the larger rotational deflections with a correspondingly softer characteristic of the rotational vibration damper are also particularly advantageous for damping or absorbing the larger vibration deflections. At higher rotational speeds, the vibration excitations in principle have a smaller vibration amplitude so that, in this state, the rotational vibration damper can operate in the range of its greater stiffness, i.e., still in the range of the pre-loading path, and therefore also provides a vibration damping behavior which is better adapted for this state of higher rotational speeds.

In this connection, it should be noted that within the meaning of the present invention the pre-loading path is that relative rotation path or relative rotation angle between the primary side and secondary side in which, proceeding from the neutral relative rotation position and, of course, in both relative rotation directions, a pre-loaded damper element unit relaxes and, in so doing, generates an action of force which assists the relative rotation in this rotating direction. This assisting action of the pre-loaded damper element unit terminates at the end of the pre-loading path so that this damper element unit essentially no longer influences the further relative rotation continuing beyond the pre-loading path until the maximum relative rotation. The maximum relative rotation of the primary side with respect to the secondary side is the maximum relative rotation angle allowed for these two groups proceeding from the neutral relative rotation position and, of course, in both relative rotation directions. For example, the maximum relative rotation can be limited by rotation stops at the primary side and secondary side, respectively, which do not permit further relative rotation.

In this regard, the construction can preferably be carried out in such a way that every damper element unit has a first supporting end area and a second supporting end area, wherein for at least one, preferably every, first supporting end area a first torque transmission supporting area is provided at the primary side and no torque transmission supporting area is provided at the secondary side, and wherein for at least one, preferably for every, second supporting end area a second torque transmission supporting area is provided at the secondary side and no torque transmission supporting area is provided at the primary side.

During relative rotation between the primary side and the secondary side in either of the two relative rotation directions, the damper element units of one of the two groups is loaded to an increased extent, while the damper element units of the other group are relieved to an increased extent or are completely relieved. In order that a defined installation position and, therefore, a defined pre-loading path can continue to be specified for the relieved damper element units, particularly also in order to prevent rattling noises, it is suggested that for at least one pre-loaded damper element unit associated with the first torque transmission supporting area of the primary side or associated with the second torque transmission supporting area of the secondary side, a relaxation limit supporting area is provided at the respective other side, primary side or secondary side, and, when a limiting relative rotation position of the primary side with respect to the secondary side is reached, which limiting relative rotation position corresponds to the pre-loading path of a pre-loaded damper element unit, the relaxation limit supporting area prevents a further relaxing of the damper element unit during relative rotation of the primary side with respect to the secondary side beyond the limiting relative rotation position.

In an alternative construction, it can be provided that at least one pre-loaded damper element unit is completely relaxed when reaching a limiting relative rotation position of the primary side with respect to the secondary side, which limiting relative rotation position corresponds to the pre-loading path.

At least one of the damper element units can comprise at least one elastically deformable damper element. This elastically deformable damper element can be constructed in a variety of ways. For example, it is possible to use elastomer material blocks such as, e.g., rubber material blocks or the like. Because of the comparatively high loading and good stability over a comparatively long operating life, at least one damper element is advantageously constructed as a spring, preferably a helical compression spring, preferably from steel material.

In order to achieve the above-mentioned action of the different groups of damper elements to the maximum extent, it is proposed that each group of damper element units comprises only pre-loaded damper element units with a limited pre-loading path. For reasons of symmetry and to prevent imbalances, it is particularly advantageous in this regard when the first group of damper element units and the second group of damper element units comprise the same number of pre-loaded damper element units with limited pre-loading path.

In this respect, it can further be provided that damper element units of the first group and damper element units of the second group are arranged successively in an alternating manner in circumferential direction.

The interaction of the damper element units of the different groups of damper element units with the primary side and secondary side, respectively, for torque transmission support and, as the case may be, also for relaxation limit support can be realized with respect to construction in a particularly simple manner in that the primary side and the secondary side have receiving windows for receiving the damper element units, and every receiving window provides a first torque transmission supporting area or a second torque transmission supporting area in at least one circumferential end area.

Since the two groups of damper element units essentially act in opposition to one another to pre-load the primary side and secondary side in direction of the relative rotation position with respect to one another, it is advantageous, particularly when the damper element units and damper elements thereof are also oriented approximately in circumferential direction, that at least one receiving window has, in its first circumferential end area, a torque transmission supporting area for a damper element unit of the first group and, in its second circumferential end area, has a torque transmission supporting area for a damper element unit of the second group.

When it is to be further provided that in a state in which the damper element units of one of the two groups are relieved, installation states which are defined for the latter are retained, for example, in an at least slightly pre-loaded state, it can be further provided that at least one receiving window has a torque transmission supporting area in its first circumferential end area and a relaxation limit supporting area in its second circumferential end area.

In principle, the construction of the torsional vibration damper can be carried out in such a way that one side, the primary side or secondary side, comprises two cover disk elements which are held at a distance from one another, and the other side, primary side or secondary side, comprises a central disk element positioned between the cover disk elements. This is a construction principle which is known, for example, from the construction of torsional vibration dampers, particularly also dual mass flywheels or the like, and which has been proven in view of the particularly stable design and the uniform loading of the damper element unit.

The principles of the present invention come into play in an advantageous manner in a rotational vibration damper particularly when the latter is constructed as a deflection mass pendulum arrangement, wherein a deflection mass arrangement is supported at one side, primary side or secondary side, and the other side, primary side or secondary side, is constructed for connecting to a torque-transmitting assembly of a power train.

Within the meaning of the present invention, a deflection mass pendulum arrangement of this kind is to be considered as an assembly which, in a torque transmitting state of a power train, is not itself integrated in the torque flow from a drive unit to a driven unit, i.e., it need not be constructed to further convey the torque to be transmitted. Rather, the rotational vibration damper is merely coupled to a torque-transmitting assembly so that it can be excited to vibrate with or by the latter and must itself merely receive or compensate for the forces generated through excitation of vibrations. This means that particularly also the damper element units of the damper element arrangement must be designed with a view to the desired absorption characteristic through generation of an oscillating pendulum movement of the deflection mass arrangement, but not with a view to the torques which also occur during very high loading in the driving state and which are to be transmitted via the power train.

The present invention is further directed to a torque transmission arrangement having a rotational vibration damper constructed according to the invention. In this respect, the torque transmission arrangement can be constructed as:

hydrodynamic torque converter, fluid coupling, wet clutch, hybrid drive module.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention will be described in detail in the following with reference to the accompanying drawings in which:

FIGS. 6a and b are views corresponding to FIG. 2 of a rotational vibration damper in a neutral relative rotation position and a relative rotation position after the pre-loading path is exceeded and before a maximum relative rotation is achieved; and FIG. 7 is a schematic view of a rotational vibration damper with an alternative construction.

DETAILED DESCRIPTION OF THE PRESENTLY PREFERRED EMBODIMENTS

Referring to FIGS. 3 to 7, various constructional types of rotational vibration dampers will be described in the following with reference to schematic drawings. It should be noted that a rotational vibration damper of this kind can basically correspond to the rotational vibration damper 24 which was described above with reference to FIG. 1 and, therefore, as a deflection mass pendulum arrangement, can exhibit the action of a fixed frequency mass damper, for example, in a hydrodynamic torque converter within the meaning illustrated in FIG. 1.

Figure 3A:
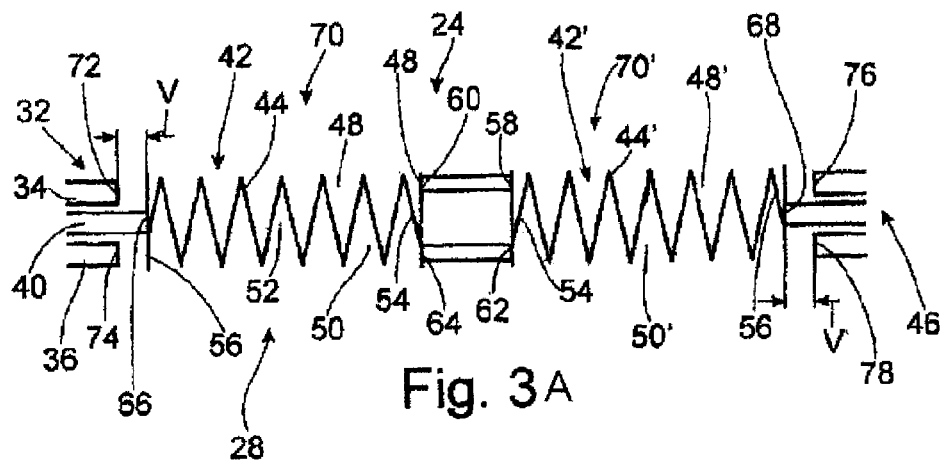
FIG. 3 is a view of a rotational vibration damper corresponding to FIG. 2 constructed according to the present invention in a neutral relative rotation position of the primary side with respect to the secondary side.
Figure 3B:
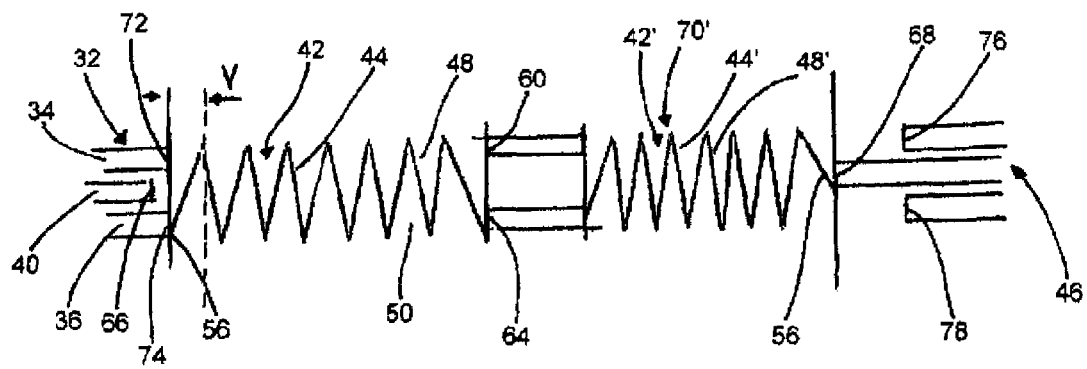
Figure 4:
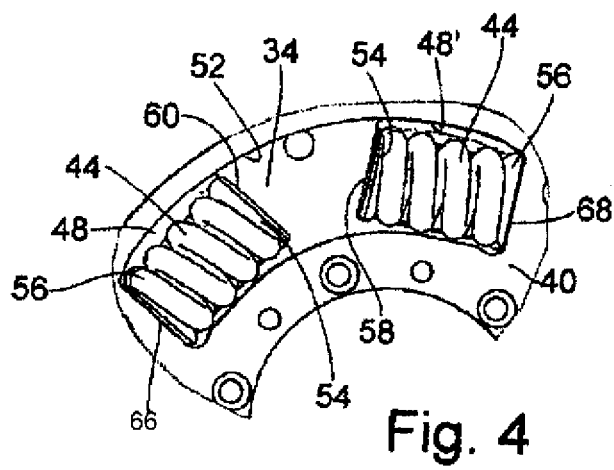
FIG. 4 is a partial axial view of the rotational vibration damper of FIG. 3.

FIGS. 3 and 4 schematically show the construction of a rotational vibration damper 24 in which the damper element arrangement 28 comprises two groups 70, 70' of damper element units 42, 42'. In the example shown, each of the damper element units 42, 42' is in turn constructed with a damper element 44, 44', for example, a helical compression spring. The damper element units 42, 42' of the two groups 70, 70' are basically provided in such a way that the two groups 70, 70' act in opposition to one another. A torque transmission supporting area 60, 64 at the primary side 32 comprising the two cover disk elements 34, 36 is associated with each damper element unit 42 of the first group 70. The torque transmission supporting areas 60, 64 provided at these two cover disk elements 34, 36 provide a common torque transmission supporting area of the primary side 32 within the meaning of the present invention. Further, a torque transmission supporting area 66 at the central disk element 40, therefore, i.e., the secondary side 46, is associated with every damper element unit 42 of the first group 70. In a corresponding manner, a torque transmission supporting area 58, 62 at the primary side 32, i.e., the two cover disk elements 34, 36, is associated with each damper element unit 42' of the second group 70'; in this case, also, the torque transmission supporting areas 58, 62 provided at these two cover disk elements 34, 36 provide a common torque transmission supporting area for the primary side 32.

Further, a torque transmission supporting area 68 at the central disk element 40 is associated at the secondary side 46 for every damper element unit 42' of the second group 70'. In this case, also, these torque transmission supporting areas are each advantageously provided by supporting edges which define spring windows 48, 50, 48', 50', 52 in circumferential direction, these spring windows 48, 50, 48', 50', 52 being formed in the cover disk elements 34, 36 and in the central disk element 40.

It will be seen in FIG. 3 that the torque transmission supporting areas 60, 64 and 58, 62, respectively, which are associated with the two damper element units 42, 42' of the two groups 70, 70' are positioned in circumferential direction between the torque transmission supporting areas 66, 68 at the secondary side 46 which are associated with these two damper element units 42, 42'. As a result, the primary side 32 and the secondary side 46 are basically pre-loaded in direction of the neutral relative rotation position which is also shown in FIG. 3. When the torque transmission units 42, 42' are constructed symmetrically, the torque transmission supporting areas 60, 64, 58, 62 on the primary side consequently lie substantially in the middle between the torque transmission supporting areas 66, 68 on the secondary side, and vice versa.

In the construction shown in FIG. 3 and FIG. 4, it is further provided that the mutually opposing damper element units 42, 42' of the two groups 70, 70' and the damper elements 44, 44' thereof are pre-loaded, i.e., are installed under pre-loading. This means that the damper element units 42, 42' in the neutral relative rotation position shown in FIG. 3 are not relaxed, so that the primary side 32 and secondary side 46 are basically pre-loaded in their neutral relative rotation position and are held therein by the pre-loading effect of the damper elements 44, 44'.

Figure 1:
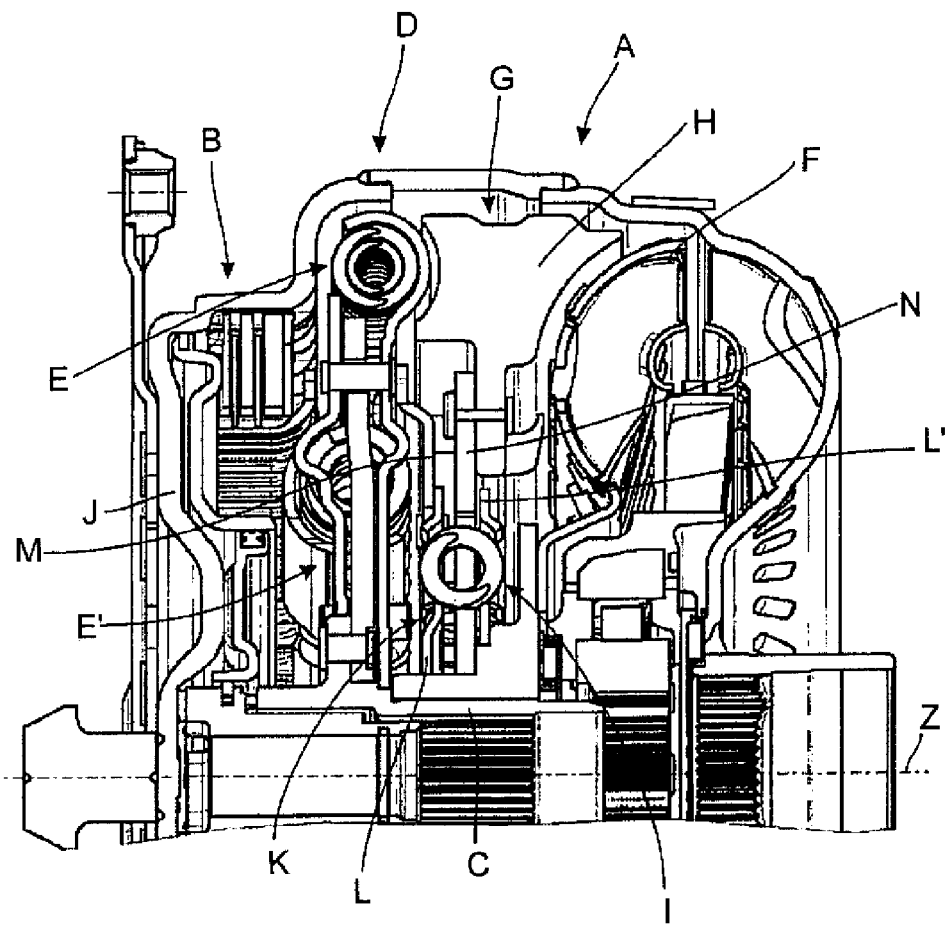
FIG. 1 is a partial longitudinal sectional view through a hydrodynamic torque converter having a rotational vibration damper constructed as a deflection mass pendulum arrangement.
Figure 2:
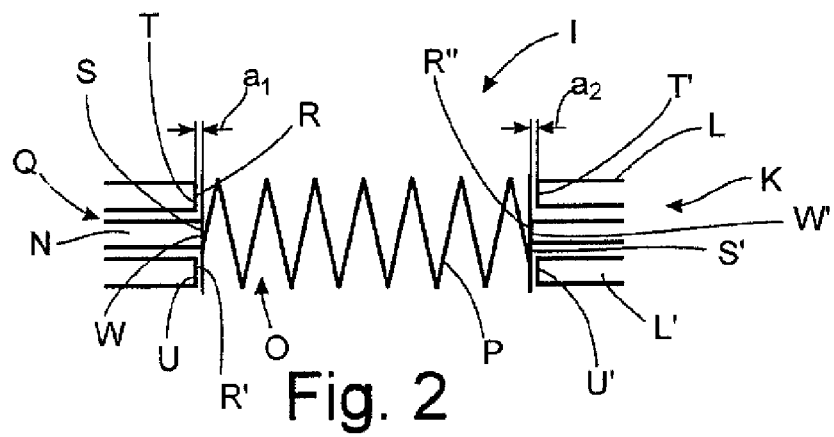
FIG. 2 is a schematic radial view showing the interaction of a damper element unit with the primary side and secondary side of the rotational vibration damper.

When a relative rotation is carried out between the primary side 32 and the secondary side 46 excited, for example, by vibrations which are transmitted to the primary side 32 connected to a torque transmission path and which cause a corresponding excitation of vibrations of the deflection mass H shown in FIG. 1, the secondary side 46, i.e., the central disk element 40, moves to the left, for example, when the primary side 32 is considered stationary in the view in FIG. 3. The damper element unit 42 and the damper element 44 thereof are gradually relaxed, while the damper element 44' of damper element unit 42' is increasingly tensioned. The relaxing of the damper element unit 42 lasts until the torque transmission supporting area 66 of the central disk element 40 lies in circumferential direction with relaxation limit supporting areas 72, 74 formed, respectively, at the cover disk elements 34, 36 in a circumferential end area of the spring windows 48, 50 thereof. The circumferential end area 56 of the damper element 44 or damper element unit 42 comes into contact with the relaxation limit supporting areas 72, 74 as the relative rotation continues, so that when the relative rotation is advanced and the compression of the damper element unit 42, 42' increases correspondingly, a further relaxation of the damper element unit 42 is no longer possible. The latter is then kept under pre-loading, which is still present but is reduced, between the torque transmission supporting areas 60, 64 and the relaxation limit supporting areas 72, 74 of the cover disk elements 34, 36, which relaxation limit supporting areas 72, 74 are associated with the torque transmission supporting areas 60, 64. As the relative rotation continues, this damper element unit 42 no longer exhibits any action of force affecting this rotation. Only the damper element unit 42' or the second group 70' with its damper element units 42' is still effective in direction of the neutral relative rotation position in the sense of generating a restoring action of the primary side 32 and secondary side 46.

From the neutral relative rotation position shown in FIG. 3 until the relaxation limit supporting areas 72, 74 take effect for the, or for each, damper element unit 42 of the first group 70, the primary side 32 and the secondary side 46 run through a relative rotation angle which corresponds to a pre-loading path V of the damper element unit 42. In the relative rotation angle range corresponding to this pre-loading path V, the, or each, damper element unit 42 of the first group 70 acts so as to assist the relative rotation between the primary side 32 and the secondary side 46. At the end of the pre-loading path V and while the relative rotation continues, this assisting action is canceled.

When the rotational vibration damper 24 moves back again in direction of the neutral relative rotation position proceeding from a state in which, as was described above, the pre-loading path V has already been exceeded, the torque transmission supporting area 66 again reaches the circumferential area in which the relaxation limit supporting areas 72, 74 are positioned. As rotation back in the direction of the neutral relative rotation position continues, the torque transmission supporting area 66 again comes into contact with the circumferential end area 56 of the damper element unit 42 and compresses the latter and the damper element 44 thereof during further relative rotation in direction of the neutral relative rotation position until reaching the state shown in FIG. 3. Accordingly, in the course of this rotational movement, the damper element unit 42 is increasingly compressed, while the damper element unit 42' of the second group 70', which is initially increasingly compressed, gradually relaxes. With a symmetrical configuration and when the neutral relative rotation position is reached, both damper element units 42, 42' or both groups 70, 70' again reach the pre-loading state provided for the neutral relative rotation position.

When the secondary side 46, i.e., the cover disk element 40, now moves in the opposite direction, i.e., to the right, owing to persisting vibration movement, with the primary side 32 considered stationary in FIG. 3, the, or each, damper element unit 42 of the first group is increasingly tensioned proceeding from the pre-loading state provided for the neutral relative rotation position so that the relative rotation of the primary side 32 and secondary side 46 is now carried out against the restoring action of the damper element units 42 of the first group 70. The, or each, damper element unit 42' of the second group 70' or the damper element 44' thereof gradually relaxes and accordingly assists the relative rotation between the primary side 32 and the secondary side 46 in this relative rotation direction.

Relaxation limit supporting areas 76, 78 are also provided at the primary side 32 or cover disk elements 34, 36 for the damper element units 42' of the second group. These relaxation limit supporting areas 76, 78 limit the spring windows 48', 50' of the cover disk elements 34, 36 in a circumferential direction, which spring windows 48', 50' receive the damper elements 44' of the damper element units 42'.

After running through a pre-loading path V' which can again correspond to a corresponding relative rotation angle between the primary side 32 and the secondary side 46 and, with respect to its extension length, to the pre-loading path V, the circumferential end area 56 of the damper element unit 42' or damper element 44' thereof comes into contact with the relaxation limit supporting areas 76, 78 providing the entire relaxation limit supporting area for this damper element unit 42'. With continuing relative rotation, the damper element unit 42 cannot relax further so that, for example, also until reaching the maximum relative rotation between the primary side 32 and the secondary side 46, the damper element units 42' of the second group 70' do not exhibit any further action influencing the relative rotation.

Figure 5:
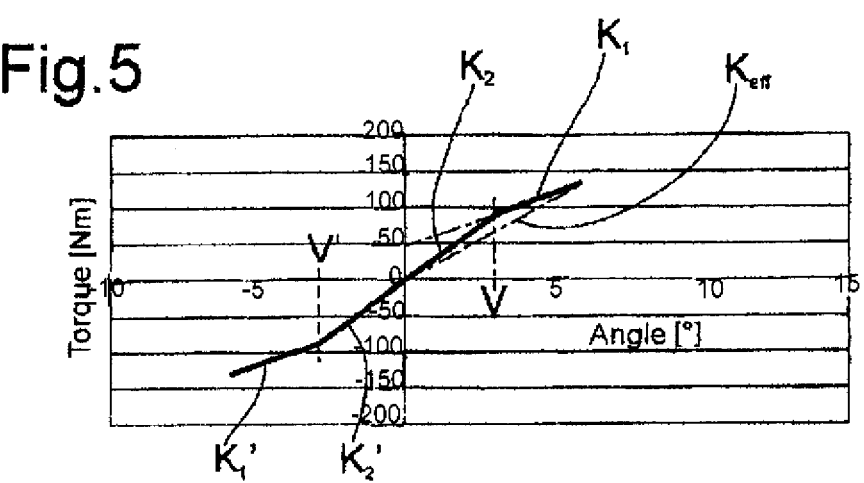
FIG. 5 is a graph in which the relative rotation angle between the primary side and the secondary side is plotted over the torque required for achieving the same.

The characteristic described above with reference to FIG. 3 in which, starting from the neutral relative rotation position, the damper element units 42, 42' of the two groups 70, 70', when they are relaxed again, act so as to influence the relative rotation only in a pre-loading path V, which pre-loading path V or V' is defined by the position of the respective relaxation limit supporting areas 72, 74, 76, 78 with respect to the torque transmission supporting areas 66, 68 at the secondary side 46, results in the characteristic line shown in FIG. 5 for a rotational vibration damper 24 constructed in this way. The pre-loading path V and V', respectively, which in this case corresponds approximately to an angle of about 3° in the respective relative rotation direction proceeding from the neutral relative rotation position is shown in the drawing. Referring to the right-hand part of this graph, for example, which shows a characteristic line segment $K_1$ after the pre-loading path V has been exceeded, it will be seen that the latter is defined by the spring constant of the damper element units 42' of the second group 70' which are tensioned while the pre-loading path V is run through and also when the latter is exceeded. The characteristic line segment $K_1$ continuing in a dashed line illustrates the theoretical characteristic curve if there were no assisting action, described above, of the other group of damper element units. In particular, it will be seen that in the neutral relative rotation position a torque of about 45 Nm would be required by the pre-loading action or pre-loading load of the damper element units 42' in order for the primary side 32 and secondary side 46 to rotate with respect to one another against this pre-loading action.

However, since the other respective group, i.e., in this case the first group 70, acts so as to assist the relative rotation in the relative rotation angle region corresponding to the pre-loading path V, the resulting characteristic line segment $K_2$ for the pre-loading path and the corresponding relative rotation angle region between primary side 32 and secondary side 46 intersects the Y-axis at 0 in the neutral relative rotation position so that, proceeding from the neutral relative rotation position, a deflection of the primary side 32 relative to the secondary side 46 can already be achieved initially with very low torque. However, this second characteristic line segment $K_2$ rises appreciably more steeply than the characteristic line segment $K_1$ on the other side of the pre-loading path V, which ultimately means that the rotational vibration damper operates with a greater stiffness, i.e., a harder characteristic, in the area of the pre-loading path V, i.e., at small relative rotation angles, than at larger deflections, i.e., beyond the pre-loading path V. This also applies, of course, for the relative rotation in the opposite direction where, with a symmetrical configuration of the two groups 70, 70', there are corresponding characteristic line segments $K_1$ and $K_2$ with a bend or transition area at the end of the pre-loading path V'.

This characteristic curve in FIG. 5, which is obtained by limiting the pre-loading action of the damper element units 42, 42' to a predetermined relative rotation angle area has a particularly advantageous effect on the vibration behavior of the rotational vibration damper 24. In the range of lower rotational speeds, comparatively large vibration excitation amplitudes are generally achieved which cause a correspondingly large deflection of the deflection mass 26. In this range of rotational speed in which, i.e., large vibration amplitudes are achieved, the rotational vibration damper 24 can operate with a comparatively soft effective characteristic represented by the effective characteristic line $K_{\mathit{eff}}$ indicated by the dash-dot line in FIG. 5. This effective characteristic line $K_{\mathit{eff}}$ is essentially achieved by the efficiency of the two characteristic line segments $K_1$ and $K_2$ which is limited with respect to time in the vibration curve. Of course, this also applies in a corresponding manner to the deflection in the opposite direction.

At higher rotational speeds, only smaller vibration excitation amplitudes and, therefore, also smaller deflections of the deflection mass 26 are achieved. In this state, essentially only characteristic line segment $K_2$ is run through. Accordingly, the rotational vibration damper 24 operates entirely in the relative rotation angle range of about +3° to about −3° which is defined by the pre-loading paths V, V'. In this state, the rotational vibration damper 24 then accordingly works with an effective hardness and characteristic line corresponding to the characteristic line segment $K_2$ so that in this state of higher rotational speed and correspondingly smaller vibration amplitudes the rotational vibration damper 24 acts with increased stiffness, which has an advantageous effect on the vibration behavior of the deflection mass and, therefore, on the absorption characteristic.

FIG. 6a shows an alternative embodiment form which likewise makes use of the efficiency of a limited pre-loading path and, therefore, leads to the characteristic line shown in FIG. 5. In FIG. 6, the primary side 32 and the secondary side 46 are in the neutral relative rotation position with respect to one another. Accordingly, with the same, or symmetrical, configuration of groups 70, 70', the two torque transmission supporting areas 66, 68 of the secondary side 46 lie in the middle between the torque transmission supporting areas 58, 62 and 60, 64, respectively, of the primary side 32.

The damper element units 42, 42' or the damper elements 44, 44' thereof are installed in a pre-loaded manner. When there is relative rotation of the primary side 32 with respect to the secondary side 46 in such a way that the secondary side 46 moves to the right referring to FIG. 6 when the primary side 32 is considered stationary, the damper element unit 42 or damper element 44 thereof initially relaxes, while the damper element unit 42' or damper element 44' thereof is increasingly tensioned. This state persists until the damper element unit 42 has reached its completely relaxed state after running through the pre-loading path V. At the end of the pre-loading path V, while the relative rotation continues, the torque transmission supporting area 66 rises from the circumferential end area 56 of the damper element unit 42 so that a further advanced relative rotation between the primary side 32 and the secondary side 40 only takes place under the influence of the, or of each, damper element unit 42' of the second group 70'.

Accordingly, while the damper element units 42, 42' in the constructional variant shown in FIG. 3 are also still held under pre-loading at the end of the pre-loading path V or V' or after exiting the latter, but do not influence further relative rotation, the damper element units 42 and 42' in the embodiment form shown in FIG. 6 are completely relaxed at the end of the pre-loading path V because relaxation limit supporting areas are not provided in this case for the damper element units. This also results in the structural difference in the embodiment form shown in FIG. 3 whereby two spring windows 48, 48' and 50, 50', respectively, of the cover disk elements 34, 36 which provide respective torque transmission supporting areas 60, 58 and 64, 62, respectively, in their circumferential end areas located adjacent to one another and which provide the relaxation limit supporting areas 72, 76 and 74, 78, respectively, in their circumferential end areas located remote of one another are associated with each spring window 52 of the central disk element 40 which provides respective torque transmission supporting areas 66, 68 in its circumferential end areas. In the embodiment shown in FIG. 6, the spring windows 48, 50 which are provided in the cover disk elements 34, 36 and which are respectively associated with two damper element units 42, 42' of different groups 70, 70' and the spring windows 52 which are provided in the central disk element 40 and are similarly associated with two damper element units 42, 42' of different groups 70, 70' are offset relative to one another in circumferential direction so that, without relaxation limit supporting areas being positioned therebetween, as is the case in FIG. 3, torque transmission supporting areas 58, 62 of the primary side 32, torque transmission supporting area 68 of the secondary side 46, torque transmission supporting area 66 of the secondary side 46, and torque transmission supporting areas 60, 64 of the primary side 32 are provided in succession circumferentially, preferably repeatedly in circumferential direction.

FIG. 7 shows an alternative constructional type of the rotational vibration damper 24. The primary side 32 and the secondary side 46 have disk parts 80, 82 which are located axially opposite one another. These disk parts 80, 82 have supporting projections 84, 86 in alternating succession in circumferential direction. A spring window 48 of the primary side 32 is formed between two successive supporting projections 84 of the primary side 32 in circumferential direction. A spring window 52 of the secondary side 46 is formed between two successive supporting projections 86 of the secondary side 46 in circumferential direction. Every spring window 48 on the primary side is limited in circumferential direction by torque transmission supporting areas 58, 60. Every spring window 52 on the secondary side is limited in circumferential direction by torque transmission supporting areas 66, 68. A damper element unit 42 of the first group 70 and a damper element unit 42' of the second group 70' are received in each spring window 48 on the primary side and each spring window 52 on the secondary side, respectively. These damper element units 42 and 42', respectively, are supported by their respective circumferential end areas 54 and 56 at the torque transmission supporting areas 58 and 60, respectively, on the primary side and the torque transmission supporting areas 68, 66 on the secondary side.

FIG. 7 clearly shows an alternating circumferential sequence of damper element units 42 of the first group 70 and damper element units 42' of the second group 70' which, of course, can also be the case in the embodiment forms described above. In particular, the damper element units 42, 42' or damper elements 44 and 44' thereof can also be installed under pre-loading in the embodiment form shown in FIG. 7, specifically in such a way that, similar to the embodiment example of FIG. 6, the damper element units 42 or 42' are completely relaxed after running through the pre-loading path V or V' during rotation in the opposite direction and no longer assist a further relative rotation between the primary side 32 and the secondary side 46.

It should be noted that the two disk parts 80, 82 in the embodiment form shown in FIG. 7 can be provided, for example, as shaped sheet metal parts in which the supporting projections 84, 86 can be formed by axial shaped structures.

In an alternate variant, the two disk parts could be arranged with respect to one another in such a way that they do not lie opposite one another in axial direction but rather in radial direction. FIG. 7 shows a partial section of a developed view along the circumference. Disk part 80 or an approximately axially extending portion thereof could surround disk part 82 or a similar axially extending portion thereof on the radially outer side. Supporting projections 84 extend radially inward, while supporting projections 86 extend radially outward. Of course, the assignment of radially outer and radially inner disk part to the primary side 32 and secondary side 46, respectively, could also be different.

In the embodiments described above, a wide variety of variations are possible in the range of principles of the present invention. For example, the two groups 70 and 70' of damper element units 42, 42' can be constructed substantially symmetrical to one another. This means that they can each comprise the same quantity of damper element units 42 and 42', preferably also with the same quantity of damper elements 44 and 44'; the alternating circumferential sequence of damper element units of the one group and damper element units of the other group indicated in FIG. 7 is advantageous because of a symmetrical construction in circumferential direction and because of the configuration which can be implemented in a structurally simple manner. In this respect, preferably all of the damper element units 42 and 42' within the present meaning are pre-loaded with a limited pre-loading path so that the dividing of the possible relative rotation path between the primary side and the secondary side with the two characteristic line segments $K_1$, $K_2$ and $K_1'$, $K_2'$, respectively, results in each of these damper element units 42 or 42'. However, it is also conceivable in principle that groups 70 and 70' comprise pre-loaded damper element units with limited pre-loading path and also damper element units which are not pre-loaded, as well as pre-loaded damper element units without limited pre-loading path which do not reach a state in which they no longer assist the further relative rotation in case of relaxation in all possible relative rotation angle regions. In this instance, an embodiment in which the rotational vibration damper 24 has different damping characteristics, i.e., different characteristic curves, in both of its relative rotation directions is also possible in principle. While the characteristic curve shown in FIG. 5 can be provided, for example, in one relative rotation direction by means of corresponding configuration of the damper element units, a characteristic curve without a bend can be achieved in the other relative rotation direction in that all of the damper element units acting in this direction are pre-loaded, but not with a limited pre-loading path.

The damper element units 42 of the first group 70 and the damper element units 42' of the second group 70' also need not necessarily be constructed identically with respect to stiffness. A stiffness of the rotational vibration damper 24 which differs depending on the relative rotation direction can also be achieved in this way. Finally, it is also possible to provide damper element units 42 and/or 42' which are configured differently with respect to one another in one or both groups 70, 70' so that characteristic lines of damper element units with different stiffness and/or different pre-loading path with respect to one another can be superimposed during relative rotation so that, as the case may be, the characteristic curves shown in FIG. 5 can also have a plurality of transition regions between characteristic line segments in the range of the possible relative rotation angle between the primary side and the secondary side.

The principles of the present invention have been described above with reference to a rotational vibration damper which, for example, can act in a hydrodynamic torque converter as a deflection mass pendulum arrangement in the sense of a fixed frequency mass damper. It should be noted that the principles of construction and function of the rotational vibration damper according to the present invention can also be applied in torsional vibration dampers integrated in a torque flow such as are also shown, for example, in FIG. 1. In this case, the damper element units and the primary side and secondary side are, of course, adapted to the requirements applicable for torque transmission. It should also be noted that the principles of the present invention can, of course, also be applied in rotational vibration dampers which are integrated in assemblies other than hydrodynamic torque converters.

The invention is not limited by the embodiments described above which are presented as examples only but can be modified in various ways within the scope of protection defined by the appended patent claims.

We claim:

1. A rotational vibration damper, comprising:
a damper element arrangement (28) including a primary side (32) and a secondary side (46) rotatable with respect to said primary side (32) around an axis of rotation (A) against the action of said damper element arrangement (28);
said damper element arrangement (28) comprising a first group (70) of damper element units (42) and a second group (70') of damper element units (42'); a first torque transmission supporting area (60, 64, 58, 62) for each damper element unit (42, 42') provided at said primary side (32) and a second torque transmission supporting area (66, 68) provided at said secondary side (46);
said damper element units (42) of said first group (70) constructed to oppose a relative rotation between said primary side (32) and said secondary side (46) only in a first relative rotation direction, and said damper element units (42') of said second group (70') constructed to oppose a relative rotation between said primary side (32) and said secondary side (46) only in a second relative rotation direction opposed to said first relative rotation direction;
at least one of said damper element unit (42) of said first group (70) and at least one of said damper element unit (42') of said second group (70') being pre-loaded in an amount corresponding to a predetermined pre-loading path (V, V') such that said primary side (32) and said secondary side (46) are pre-loaded in a basic relative rotation position with respect to one another; and wherein proceeding from said basic relative rotation position of said primary side (32) with respect to said secondary side (46), said pre-loading path (V, V') of at least one of said pre-loaded damper element units (42) is shorter than a maximum relative rotation path of said primary side (32) with respect to said secondary side (46).

2. The rotational vibration damper according to claim 1, wherein each said damper element units (42, 42') additionally comprises a first supporting end area (54) at said primary side (32), and a second supporting end area (56) at said secondary side (46); and wherein for at least one of said first supporting end areas (54) a first torque transmission supporting area (60, 64, 58, 62) is provided at said primary side (32) and no torque transmission supporting area at said secondary side (36); and wherein for at least one of said second supporting end areas (56) a second torque transmission supporting area (66, 68) is provided at said secondary side (46) and no torque transmission supporting area at said primary side (32).

3. The rotational vibration damper according to claim 2, additionally comprising a relaxation limit supporting area (72, 74, 76, 78) for at least one of said pre-loaded damper element units (42, 42') associated with said first torque transmission supporting area (60, 64, 58, 62) of said primary side or associated with said second torque transmission supporting area (66, 68) of said secondary side (46), said relaxation limit supporting area (72, 74, 76, 78) located at said respective other side of one of said primary side (32) and said secondary side (46) such that when a limiting relative rotation position of said primary side (32) with respect to said secondary side (46) is reached corresponding to said pre-loading path (V, V') of said pre-loaded damper element unit (42), said relaxation limit supporting area (72, 74, 76, 78) prevents a further relaxing of said damper element unit (42, 42') during relative rotation of said primary side (32) with respect to said secondary side (46) beyond said limiting relative rotation position.

4. The rotational vibration damper according to claim 1, wherein at least one of said pre-loaded damper element units (42, 42') is completely relaxed when reaching a limiting relative rotation position of said primary side (32) with respect to said secondary side (46), said limiting relative rotation position corresponding to said pre-loading path (V, V').

5. The rotational vibration damper according to claim 1, wherein each of said groups (70, 70') of damper element units (42, 42') comprises only pre-loaded damper element units (42, 42') with a limited pre-loading path (V, V').

6. The rotational vibration damper according to claim 1, wherein said first group (70) of damper element units (42) and said second group (70') of damper element units (42') comprise said same number of pre-loaded damper element units (42, 42') with limited pre-loading path (V, V').

7. The rotational vibration damper according to claim 6, wherein said damper element units (42) of said first group (70) and said damper element units (42') of said second group (70') are arranged successively in an alternating manner in circumferential direction.

8. The rotational vibration damper according to claim 1, wherein said primary side (32) and said secondary side (46) additionally comprise receiving windows (48, 50, 52; 48, 48', 50, 50', 52) for receiving said damper element units (42, 42'), and wherein every receiving window (48, 50, 52; 48, 48', 50, 50', 52) provides a first torque transmission supporting area (60, 64, 58, 62) or a second torque transmission supporting area (66, 68) in at least one circumferential end area.

9. The rotational vibration damper according to claim 8, wherein said at least one receiving window (48, 50, 52; 48, 48', 50, 50', 52) comprises, in its first circumferential end area, a torque transmission supporting area for a damper element unit (42) of said first group (70) and, in its second circumferential end area, comprise a torque transmission supporting area for a damper element unit (42') of said second group (70').

10. The rotational vibration damper according to claim 9, wherein said at least one receiving window (48, 48', 50, 50') has said torque transmission supporting area (60, 64, 58, 62) in its first circumferential end area and a relaxation limit supporting area (72, 74, 76, 78) in its second circumferential end area.

11. The rotational vibration damper according to claim 1, wherein one of said primary side (32) and secondary side (46) comprises two cover disk elements (34, 36) held at a distance from one another; and the other of said primary side (32) and secondary side (46) comprises a central disk element (40) positioned between said cover disk elements (34, 36).

12. The rotational vibration damper according to claim 1, additionally comprising a deflection mass arrangement (26) supported at one of said primary side (32) and secondary side (46); the other of said primary side (32) and secondary side (46) being constructed for connecting to a torque-transmitting assembly (16) of a power train.

13. A torque transmission arrangement comprising a rotational vibration damper according to claim 1.

14. The torque transmission arrangement according to claim 13 constructed as one of: a hydrodynamic torque converter; a fluid coupling; a wet clutch; and a hybrid drive module.

* * * * *